United States Patent [19]

Brundige

[11] 4,310,313
[45] Jan. 12, 1982

[54] KIT FOR NEEDLEPOINT WORK

[76] Inventor: Marie K. Brundige, Bliss Rd., Box 90, Sugar Grove, Ill. 60554

[21] Appl. No.: 166,314

[22] Filed: Jul. 7, 1980

[51] Int. Cl.$^3$ .............................................. G09B 19/20
[52] U.S. Cl. ......................................... 434/95; 206/574
[58] Field of Search ........................... 434/95; 206/574; 28/149

[56] References Cited

U.S. PATENT DOCUMENTS

| | | | |
|---|---|---|---|
| 328,283 | 10/1885 | Brinkerhoff | 434/95 X |
| 532,110 | 1/1895 | Stockmann | 434/95 |
| 778,162 | 12/1904 | Wulle | 434/95 |
| 1,954,424 | 4/1934 | Otwell | 47/9 |
| 2,078,646 | 4/1937 | Treinis | 434/95 |
| 2,149,274 | 3/1939 | Clack | 28/149 |
| 2,150,024 | 3/1939 | Clack | 28/149 |
| 2,301,410 | 11/1942 | Kaplan et al. | 434/95 |
| 2,511,947 | 6/1950 | Samuels | 434/95 X |
| 2,778,488 | 1/1957 | Brown | 434/95 X |
| 4,127,191 | 11/1978 | Cave | 206/574 |

*Primary Examiner*—William H. Grieb
*Attorney, Agent, or Firm*—McWilliams, Mann & Zummer

[57] ABSTRACT

This invention pertains to a needleworking kit designed to facilitate the work of completing a needlepoint design created on a canvas, using buttonhole stitches and which includes a graph marked in colors to indicate where such stitches will be made on the grid of a canvas, with yarns of the indicated colors. The graph lines are numbered vertically and horizontally and the canvas is correspondingly marked for readily locating the numbered lines of the graph and further to facilitate locating the positions of such lines on the canvas it is divided into quarter sections by appropriate markings. The colored markings on the graph are disposed diagonally of the grid intersections, each in the color and in the direction of the yarn to be stitched over the respective intersections. The kit also inclludes a set of instructions, one or more needles of the type dictated by the needlepoint design as well as a supply of yarns in the colors called for by the design and the kit may include a container for the complete kit.

8 Claims, 3 Drawing Figures

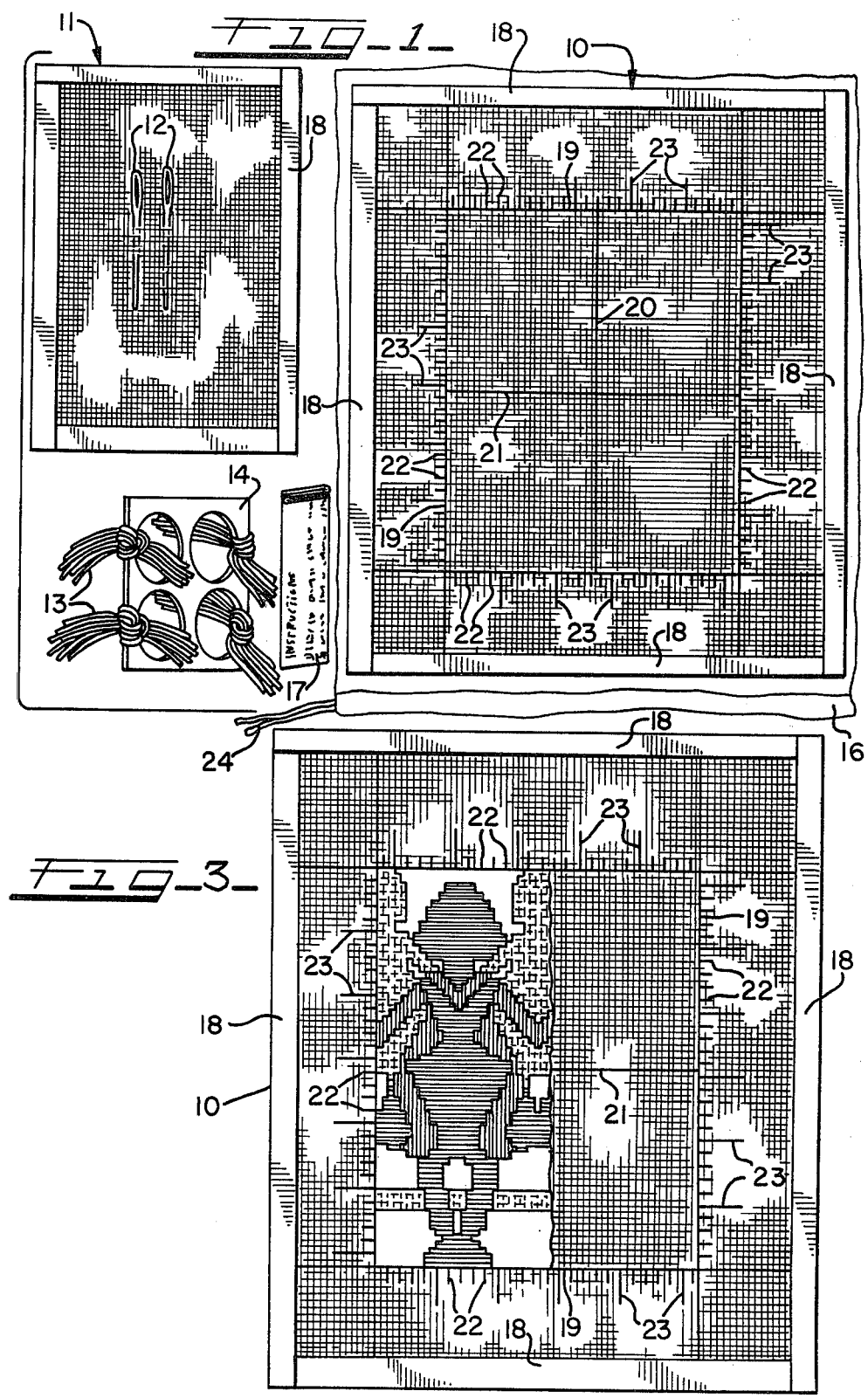

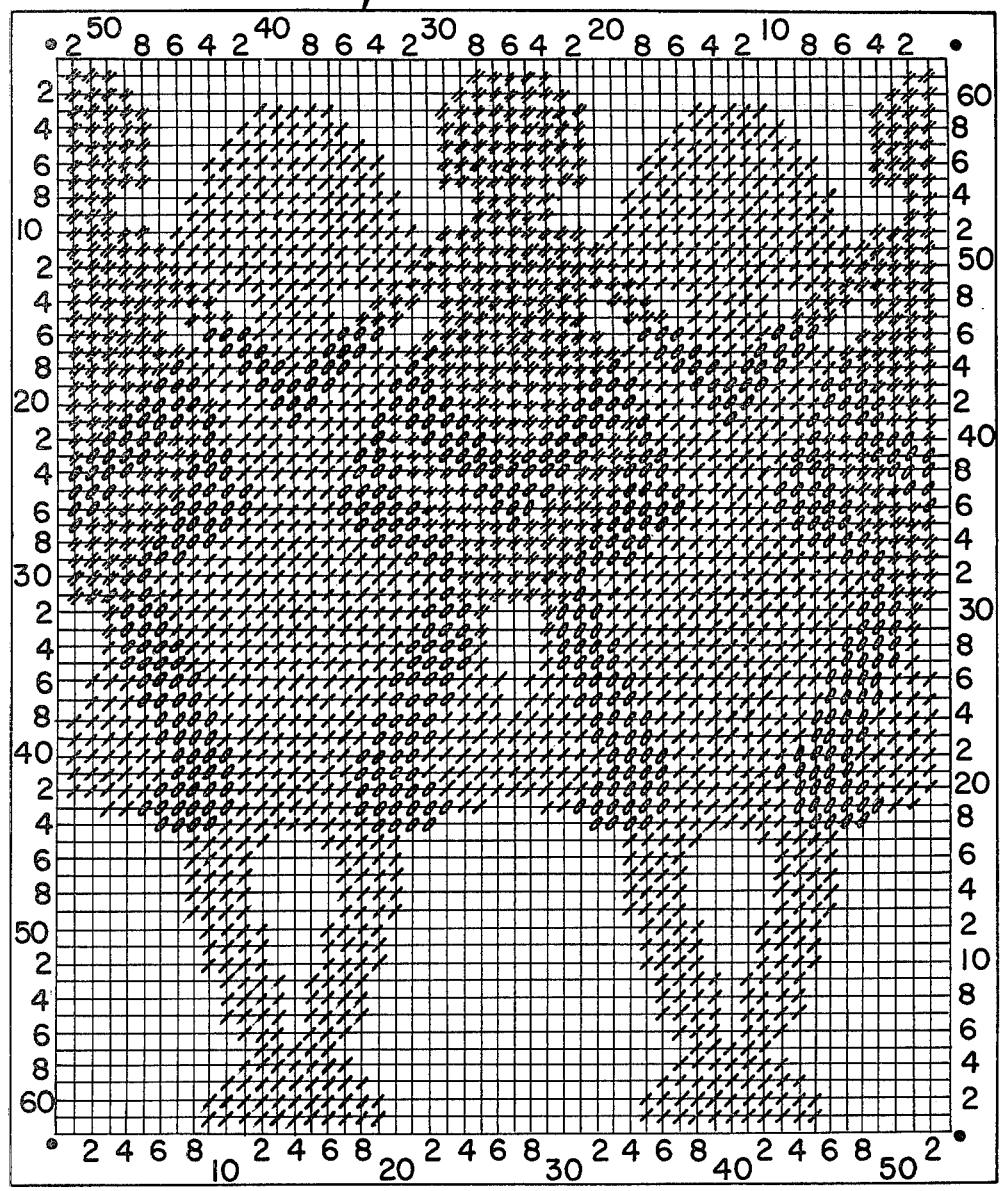

KIT FOR NEEDLEPOINT WORK

BACKGROUND OF THE INVENTION

It is readily apparent that various types of kits have been available in the prior art such as a method for teaching embroidery to the blind wherein raised lines were utilized to form a grid and raised symbols in certain areas of the grid were used to represent color, as in U.S. Pat. No. 532,110. Patterns have been available on cardboard for manufacture of rugs and which consisted of a series of strips, each color coded to locate and identify the yarn to be used, as in U.S. Pat. No. 328,283. Embroidery methods have been taught by use of a diagram system which utilized stitch marking lines to indicate the type and positions of the stitches used, as in U.S. Pat. No. 778,162. Plans have been provided on mulching paper indicating the type and locations of seeds, or bulbs, to be planted in a plot of soil, as in U.S. Pat. No. 1,954,424. Grid patterns have been utilized in braiding rugs wherein the several squares of the grid are colored to represent the locations and colors of the material to be used, as in U.S. Pat. No. 2,150,024. Latch hook rug making kits have been available wherein a grid pattern was included and in which each square contained a number corresponding to the color of the yarn to be used at each location, as in U.S. Pat. No. 4,127,191.

Other types of kits have also been available but the art does not reveal any kind of a needleworking kit that includes a specifically definitive chart and complementally marked canvas for working needlepoint as contemplated herein.

SUMMARY OF THE INVENTION

The invention comprehends a complete needlepoint kit that contains fully inclusive materials and instructions for working a needlepoint design. The kit includes a graph type chart wherein the grid lines are numbered vertically as well as horizontally and the grid intersections are marked in colors to indicate the location of stitches as well as the direction thereof and the color of each stitch for the location indicated. A canvas is included which is correspondingly marked to enable the numbered locations on the chart to be identified on the canvas and to make this information more readily ascertainable the canvas is divided into four sections whereby the grid lines, even though unnumbered, may be more readily located as defined by the chart. A supply of yarns in the colors and amounts required is included with the kit, as well as a full set of instructions for proceeding with the work of needlepointing the canvas. One or more needles are provided and the kit may include a container adapted to enclose the entire kit. The marking of the chart to indicate the numbering of the vertical and horizontal lines is done around the perimeter of the graph while the corresponding markings on the canvas are disposed largely within the area of the canvas and the line indications projecting only minimally beyond the work area. The edges of the canvas preferably may be bound, or taped, to avoid the rough edges of an unfinished canvas.

OBJECTS OF THE INVENTION

It is the primary purpose of the invention to provide a complete needlepoint kit wherein working instructions are held to a minimum by means of a chart and a canvas containing full information for proceeding with the needlepoint work.

The principal object of the invention is the provision of a needlepoint working kit including a graph form chart wherein at least certain of both the vertical and horizontal lines are numbered and a canvas correspondingly marked to indicate the positions of the lines numbered on the chart, with the locations and disposition of the stitches shown on the chart.

An important object of the invention is to provide a needlepoint working kit including a chart having certain numbered grid lines about the perimeter of the chart and indicating stitches by location, placement and color and a canvas marked to indicate locations of lines corresponding to numbered lines on the chart.

Another object of the invention is the provision of a needlepoint kit including a graph type chart containing specific information for the location, disposition and color of each needlepoint stitch and a canvas marked for division into quarter sections and further marked corresponding to certain of the information contained in the chart.

A further object of the invention is to provide a needlepoint kit including a chart, a canvas, an instruction sheet, one or more needles, a full supply of yarns and a container may be provided for enclosing the entire kit wherein the chart contains information identifying the placement of needlepoint stitches, their color and their disposition and the canvas is marked to facilitate location of the stitches as identified on the chart.

DESCRIPTION OF THE DRAWINGS

The foregoing and other and more specific objects of the invention are attained by the needlepoint kit illustrated in the accompanying drawings wherein FIG. 1 is a general view of the needlepointing kit work elements comprised of a marked canvas, a pair of needles on a practice canvas, an instruction sheet and a supply of needlepoint yarn on a holder.

FIG. 2 is a view of the chart, or graph, to somewhat larger scale, illustrating the diagram of the needlepoint design in the colors of the stitches to be applied in the directions indicated and showing the present method of numbering the graph lines; and FIG. 3 is an illustration of a partially completed needlepoint design on a canvas in accordance with this invention clearly revealing how the markings on the lines corresponding to the numbered lines on the chart makes the locations for application of the needlepoint stitches easily discernible.

DESCRIPTION OF PREFERRED EMBODIMENT

Needlepoint kits have been quite basic and normally include only the necessary materials and supplies and limited, if any, instructions, or information for working a needlepoint design. The present needlepoint kit is unique in design and in the layout of the informative graph and the canvas as well. The informative graph is more accurate than kits where a canvas is provided with a hand painted, or a printed design and the graph is easier to read than one that uses symbols for colors. The present graph is color coded by placing colored marks on the intersections of the vertical and horizontal lines exactly where the stitches are to be worked on the canvas. If intersections are not marked this immediately indicates that a preselected background color is to be used. The perimeter of the pattern design is laid out clearly on the graph and the canvas is correspondingly marked with the lines numbered on the graph and these lines are clearly revealed on the canvas even though numbers are not used. This marking simplifies the necessity for counting and counting is what needlepoint work requires to a considerable extent and most importantly must be performed with the utmost accuracy. The marking of the design perimeter on the canvas also helps in this respect and indicates exactly the size of the design and the extent of the work.

Needlepointing ordinarily is not a complicated task but this system simplifies the work as much as is possible and requires basically a canvas, a graph, both marked as disclosed herein, a tapestry needle, various colored yarns and a pair of scissors. The basic stitch is accomplished by covering two intersecting strands in a canvas with a yarn of the color indicated by the graph disposed in the direction indicated thereby. These stitches are preferably worked on the diagonal which may be commonly referred to as "basketweave", but the stitches may be worked in other ways. Working the stitches on the diagonal offers several advantages, the most important of which is that the canvas is not distorted, or pulled out of shape. The stitching as well as the blocking are easier and it will not be necessary to turn the canvas upside down and then rightside up as the work is performed.

The stitches might be worked right-to-left, turning the canvas upside down at the end of a row and working back right-to-left, which may be referred to as "continental". The stitches may be worked in a single diagonal line to the left, top to bottom or they might be worked on a single diagonal line to the right, working either from the bottom upward, or from the top downward. Also, the stitches may be worked in a single vertical line from top to bottom. With this kit and the information included, a needlepointer should be able to work the stitches in any of these directions, or in any combination of the several directions indicated. The scissors used with this needlework must be those made expressly for this type of work comprising a small scissors with narrow, pointed ends.

The present kit in addition to the working materials furnished will include several features contributing to the convenience of using this system. In addition to the general instructions for doing this type of needlepointing, the kit will include instructions on how to needlepoint, instructions for repeating a design, a set of instructions completely detailing a method of blocking the completed canvas, printed dimensions on each canvas to provide information needed in the blocking procedure and a re-order form. Information may be furnished as to choices of color combinations and suggestions as to the uses to be made of finished needlepoint items.

This improved needlepoint kit as shown in FIGS. 1 and 2 includes a specially marked canvas 10, a practice canvas 11, a pair of needles 12, inserted into the practice canvas 11, a supply of colored yarns 13 on a holder 14, a specially informative chart in the form of a marked graph 15 and a container for all of these items may be furnished in the form of a clear plastic bag 16. One or more sheets of instructions may be included as indicated at 17. The canvas 10 is disclosed as including an edge binding to avoid the normally raw edge when a canvas is cut to size. The binding as here disclosed, may comprise a self-adhering tape 18 which may be applied in one continuous piece, or it might be applied on each side as a separate piece, as illustrated in FIGS. 1 and 3.

The practice canvas 11 may be similarly bound around the edges utilizing the tape 18, if desired.

Referring now to FIG. 2 it will be seen that the graph 15 provides a unique approach to needlepointing that simplifies the actual work of doing a needlepoint design and enables the start of such work to proceed immediately without the necessity for searching out a starting point, or struggling to locate places for particular stitches and without any doubt as to the color of the stitches to be used. The particular method of numbering the lines of the graph 15 is important to the ease with which this needlepoint system is used. As clearly indicated in the drawing, the graph lines are numbered alternately as 2, 4, 6, 8 and these markings are disposed closely adjacent to the edges, or perimeter of the needlepoint design, or pattern and every tenth number is applied in an outstanding location so that these numbers are more readily discernible and quickly make the locations of specific lines more easily ascertainable. It should be noted especially that the numbers progress from right to left at the top of the graph, then progress downwardly at the left hand side, then across the bottom from left to right and upwardly at the right hand side of the graph. This makes reading of the graph more easily accomplished and as a further aid in this respect the numbers start at zero at each corner of the graph and proceed across each side as shown in FIG. 2.

In addition to numbering the lines of the graph in the manner indicated to facilitate the location of stitches to be applied, the chart is further marked to show the actual locations of stitches, the placement of the stitches and the respective colors of the several yarns to be used in a particular design. As an example, FIG. 2 shows a pattern, or design for a needlepoint canvas, using three different colors and these colors are indicated by three different types of marks on the graphs. However, more colors may be used in some needlepoint designs where a larger, or a more extensively colored pattern is utilized and the graph may readily be marked accordingly.

The stitch markings on the graph are applied in the colors of the yarns to be used, each stitch being indicated at the exact location of the particular colored yarn 13 to be applied on the canvas. All of the stitch markings extend diagonally on the graph and are located at intersections of vertical and horizontal lines of the graph. These locations may be at the intersections of numbered lines, or they may occur where unnumbered lines intersect, or at a numbered line intersecting with an unnumbered line, but in any event the exact location for the stitch on a canvas can easily be determined by observing the numbering of the graph lines about the perimeter. The colored markings on the graph define the pattern, or needlepoint design area and all of the remaining areas of the graph not containing any stitch markings are for the application of stitches in a colored yarn 13 adopted as the background color for the overall needlepoint design for the purpose of completing a canvas. The background stitches, of course, will extend in the same direction as the design stitches. The perimetrically enclosed design of the graph 15 is specifically complimented by a similar perimetrically marked pattern area on the canvas 10.

The canvas 10, as best indicated in FIGS. 1 and 3, is correspondingly marked to enable the numbered lines of the graph 15 to be located readily on the canvas even though the canvas lines are not numbered. The pattern area for application of the needlepoint design is defined on the canvas by perimeter lines 19 and this design work area is divided into four sections by vertical and horizontal lines 20 and 21. Extending outwardly from the perimeter 19, relatively short lines 22 are located on the vertical and horizontal strands of the canvas 10 corresponding to the graph lines number 2, 4, 6, 8 and outwardly extending lines 23, which are of greater length than the short lines 22, correspond with the lines numbered 10, 20, 30, etc., on the graph 15. Thus, with the design work area divided into quarter sections by the lines 20 and 21 and the perimetrical markings 22 and 23 clearly indicating the locations of the lines corresponding to the numbered lines on the graph 15, any location for working a stitch of the proper color yarn 13 into the needlepoint pattern, can readily be identified.

In working a needlepoint design the stitches are applied on a canvas which, depending upon the fineness of the pattern for the design, involves a somewhat loosely woven grid comprised of the vertical and horizontal strands of the canvas and the stitches are worked by bringing the yarn 13 upwardly through a space below a horizontal strand and to one side of a vertical strand, over the intersecting strands and then downwardly through a space above the horizontal strand and to the opposite side of the vertical strand, thus covering the grid intersection. The stitches can be continued in a diagonal direction, or they can be worked from right to left, or from top to bottom. The colored stitch marks, representing the color of the yarn 13 to be used, are placed on the graph at the grid intersections to be covered in particular colors and thus leave no question in the mind of the needlepointer as to where the stitches are to be worked into the canvas.

When starting out with this needlepoint kit the needlepointer may want to try a few stitches, or possibly work a simple needlepoint design and for this purpose the practice canvas 11 may be used to good purpose. The practice canvas 11, like the canvas 10, is what is known as a No. 10 canvas, i.e., it has ten grids to the inch and the graph paper used is a size 10 also, containing ten grids to the inch. Thus, in transferring information from the graph to the canvas the corresponding dimensions are exact and the stitches to be applied to the canvas are located precisely. The instruction sheet included with the kit provides full information for performing needlepoint using the materials of the kit and may include information also for blocking the needlepoint when it has been completed so that the needlepointer can perform all of the work involved from the start of the needlepointing to the utilization of the completed canvas wherever it might be used. It is necessary to know the actual dimensions of a canvas for use in the blocking procedure and for this purpose the canvas 10 has the true dimensions printed thereon. The plastic bag 16, if furnished, will be provided with a drawstring closure 24 which will enable the bag to be securely closed against loss of any of the contents and enables the bag to be used for the purpose of containing the materials between working sessions and readily reopened for access to the materials.

CONCLUSION

The needlepointing kit of this invention provides a canvas containing certain information that is correlated with information contained on a related graph wherein complete details of the needlepointing procedure are available without the actual necessity of relying upon separate instructions for knowledge as to how to proceed to work a needlepoint canvas. The graph is color coded and is clearly marked as to exactly where particular colored yarns are to be stitched on the canvas and the placement of such stitches. The particular manner of numbering the lines on the graph both vertically and horizontally by twos and cumulative by tens is advantageous in identifying locations where stitches of specific colors are to be worked into the canvas and the division of the working area of the canvas into quarter sections facilitates this locating and counting of the grid lines so that the intersections can be readily identified.

The needlepoint pattern area of the canvas is perimetrically defined in accordance with the graph and marks are provided outwardly of the perimeter corresponding to the lines numbered by twos on the graph and also those numbered by tens even though the canvas is not so numbered. Using the materials and method afforded by this kit will enable a needle-pointer to cover the back side of a canvas as smoothly and evenly as the front side both for the beauty of the design and neatness of the work as well as the wearability and durability of the completed needlepointed canvas.

What is claimed is:

1. A kit for working needlepoint including an open weave canvas having horizontal and vertical rows of intersecting strands forming a grid with spaces defined therebetween, said canvas having imprinted on certain of the component strands a perimetric marking defining the outer border of a needlepoint pattern, a vertical line bisecting the interior of the defined perimeter in two sections, a horizontal line bisecting the interior of the defined perimeter into two sections, a series of lines extending outwardly from the perimetric marking to identify and locate intersections in said grid to be covered by needlepoint stitches; a graph type chart sheet including horizontal and vertical grid lines corresponding to the horizontal and vertical rows of said intersecting strands of said canvas, a perimetric marking and horizontal and vertical bisecting lines corresponding to the perimetric marking and the horizontal and vertical bisecting lines on said canvas, a series of numerical designations adjacent to and outwardly of the perimetric marking to identify and locate grid intersections on the canvas to be covered by needlepoint stitches, a plurality of colored markings located at the intersections of the horizontal and vertical lines, each marking designating the color of a needlepoint stitch to be used in covering the corresponding intersection of said canvas whereby the colored markings define a pattern inside said perimetric marking comprising the needlepoint design formed on the canvas by covering the designated intersections with stitches of the colors designated by the colored markings; a plurality of colored yarns corresponding in color and amount to said colored markings on said graph type chart for use in working the needlepoint design defined on said chart; and one or more needlepoint needles.

2. A kit for working needlepoint as set forth in claim 1 wherein said numerical designations are comprised of even numbers by two's, and a series of numerical designations in multiples of said even numbers comprising numbers by tens.

3. A kit for working needlepoint as set forth in claim 1 wherein said colored markings at the intersections of the horizontal and vertical grid lines of the chart are disposed diagonally in the directions of the stitches indicated.

4. In a needlepoint kit including an open weave canvas having horizontal and vertical rows of strands forming a grid, a chart, a plurality of colored yarns, and one or more needles; the improvement comprising said chart having a diagram including horizontal and vertical grid lines corresponding to the horizontal and vertical rows of said strands, a perimetric marking on the diagram, a series of numerical markings outwardly of the perimetric marking identifying certain of said horizontal and vertical grid lines, a plurality of colored markings at certain intersections of the horizontal and vertical grid lines indicating the yarn color of a needlepoint stitch to cover the respective intersections, said canvas having a perimetric marking corresponding to the perimetric marking on said diagram and defining a needlepoint pattern area, a series of markings outwardly of the perimetric marking identifying horizontal and vertical strands corresponding to the horizontal and vertical grid lines on the diagram identified by said numerical markings, and horizontal and vertical markings on the canvas dividing said pattern area into quarter sections.

5. A needlepoint kit as set forth in claim 4 wherein said numerical markings identify alternate horizontal and vertical grid lines, and the markings on said canvas identify strands corresponding to such alternate markings on the diagram.

6. A needlepoint kit as set forth in claim 5 wherein said numerical markings include markings at intervals embracing multiples of the alternate markings and disposed outwardly of said perimetric marking to a greater extent than the alternate markings.

7. A needlepoint kit as set forth in claim 6 wherein said markings on the canvas dividing said pattern area into quarter sections comprise a vertical line bisecting the interior of the defined area in two equal halves horizontally and a horizontal line bisecting the interior of the defined area into two equal halves vertically.

8. A needlepoint kit as set forth in claim 6 wherein a practice canvas is included of smaller dimensions than said open weave canvas, and said needles are inserted in said practice canvas.

* * * * *